US011916740B2

(12) United States Patent
Chen (10) Patent No.: US 11,916,740 B2
(45) Date of Patent: Feb. 27, 2024

(54) K8S-BASED SERVICE DEPLOYMENT METHOD AND APPARATUS, DEVICE, AND MEDIUM

(71) Applicant: INSPUR SUZHOU INTELLIGENT TECHNOLOGY CO., LTD., Jiangsu (CN)

(72) Inventor: Qingshan Chen, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/014,798

(22) PCT Filed: Feb. 20, 2021

(86) PCT No.: PCT/CN2021/076995
§ 371 (c)(1),
(2) Date: Jan. 6, 2023

(87) PCT Pub. No.: WO2022/007406
PCT Pub. Date: Jan. 13, 2022

(65) Prior Publication Data
US 2023/0300030 A1 Sep. 21, 2023

(30) Foreign Application Priority Data
Jul. 10, 2020 (CN) .......................... 202010664169.2

(51) Int. Cl.
*H04L 41/0893* (2022.01)
*H04L 67/56* (2022.01)
(Continued)

(52) U.S. Cl.
CPC ...... *H04L 41/0893* (2013.01); *H04L 41/0895* (2022.05); *H04L 67/10* (2013.01); *H04L 67/56* (2022.05)

(58) Field of Classification Search
CPC ....... H04L 41/08; H04L 41/0893–0895; H04L 67/10
See application file for complete search history.

(56) References Cited

U.S. PATENT DOCUMENTS 10,528,367 B1   1/2020  Liu et al.
11,563,636 B1 * 1/2023  Kairali ............... H04L 67/562
(Continued)

FOREIGN PATENT DOCUMENTS

CN   109981789 A   7/2019
CN   110427249 A   11/2019
(Continued)

OTHER PUBLICATIONS

Corresponding International Patent Application No. PCT/CN2021/076995, International Search Report, dated May 21, 2021.
(Continued)

*Primary Examiner* — Brendan Y Higa
(74) *Attorney, Agent, or Firm* — Cooper Legal Group LLC (57) ABSTRACT

A K8S-based service deployment method, apparatus, device, and medium, including: acquiring service data, the service data includes data corresponding to one service; deploying the service on a first target pod according to the service data; deploying a proxy corresponding to the service on the first target pod based on a sidecar manner, so as to use the proxy as a network proxy of the service; and acquiring a preset ConfigMap corresponding to the first target pod, whereby the proxy performs communication between different pods according to the preset ConfigMap, the preset ConfigMap includes routing information. As such, only one service is deployed on one pod, and a separate service does not need to be deployed to string together each independent service
(Continued)

on one pod, thus reducing the workload in a service deployment process, and improving resource utilization.

20 Claims, 5 Drawing Sheets

(51) Int. Cl.
*H04L 67/10* (2022.01)
*H04L 41/0895* (2022.01)

(56) References Cited

U.S. PATENT DOCUMENTS

| | | | | |
|---|---|---|---|---|
| 2020/0252376 | A1* | 8/2020 | Feng | H04L 63/0263 |
| 2021/0019194 | A1* | 1/2021 | Bahl | H04L 67/1031 |
| 2021/0152554 | A1* | 5/2021 | Taft | H04L 41/0895 |
| 2022/0109693 | A1* | 4/2022 | Mashargah | H04L 41/0869 |
| 2022/0116445 | A1* | 4/2022 | Filippou | H04L 41/0853 |
| 2022/0124150 | A1* | 4/2022 | Alagna | H04L 61/4511 |
| 2022/0263805 | A1* | 8/2022 | Ray | H04L 9/30 |
| 2022/0385581 | A1* | 12/2022 | Delos Reyes | H04L 43/062 |

FOREIGN PATENT DOCUMENTS

| | | |
|---|---|---|
| CN | 110716744 A | 1/2020 |
| CN | 110752947 A | 2/2020 |
| CN | 111212129 A | 5/2020 |
| CN | 111901157 A | 11/2020 |

OTHER PUBLICATIONS

Corresponding International Patent Application No. PCT/CN2021/076995, Written Opinion, dated May 21, 2021.
Corresponding Chinese Patent Application No. 202010664169.2, Notification to Grant Patent dated Oct. 9, 2022.
Balla, David et al., "Adaptive scaling of Kubernetes pods", NOMS 2020—2020 IEEE/IFIP Network Operations and Management Symposium, 2020, p. 1-5.
Ditie Changping Xian, ConfigMap of k8s, (CNBlogs, https://www.cnblogs.com/sseban/p/13080787.html), Jun. 9, 2020, with Non-offiical translation.

* cited by examiner

K8S-BASED SERVICE DEPLOYMENT METHOD AND APPARATUS, DEVICE, AND MEDIUM

This application claims priority to Chinese Patent Application No. CN202010664169.2, filed on Jul. 10, 2020, in China National Intellectual Property Administration and entitled "K8S-based Service Deployment Method and Apparatus, Device, and Medium", the contents of which are hereby incorporated by reference in its entirety.

FIELD

The present application relates to the field of computer technology, and particularly to a Kubernetes (K8S)-based service deployment method and apparatus, a device, and a medium.

BACKGROUND

In K8S (i.e., Kubernetes), it is common to deploy multiple independent models in the same pod and develop an independent service to invoke the independent models in this pod, namely the independent service is responsible for invoking the independent models in the pod in the same order as they are designed. In addition, an output of a previous pod is taken as an input of a current pod. One independent model corresponds to one service. However, in this mode, when scaling is required, the only method is to scale the entire pod, reducing the flexibility in a scaling process. In addition, it is necessary to develop an independent service to string together the independent models in the pod, which increases the workload in service development. When a certain independent model is modified, for example, the sequence is adjusted, or a certain independent model is added or deleted, the entire pod is required to be recompiled. As a result, relatively long time is required to modify the service. Moreover, in terms of resource occupation, a pod deployed with multiple independent models is unable to achieve the highest resource utilization, and like the cask principle, bottlenecks may exist on the most resource-consuming model.

SUMMARY

In view of this, an objective of the present application is to provide a K8S-based service deployment method and apparatus, a device, and a medium, which may improve the flexibility in service deployment as well as the resource utilization. Certain solutions are as follows.

In a first aspect, the present application discloses a K8S-based service deployment method, including:
 acquiring service data including data corresponding to one service;
 deploying the service on a first target pod according to the service data;
 deploying a proxy corresponding to the service on the first target pod based on a sidecar manner, so as to use the proxy as a network proxy of the service; and
 acquiring a preset ConfigMap corresponding to the first target pod, whereby the proxy performs communication between different pods according to the preset ConfigMap, wherein the preset ConfigMap includes routing information.

In an embodiment, after the step of deploying the proxy corresponding to the service on the first target pod based on the sidecar manner, the method further includes:
 establishing a communication connection between the service and the proxy based on a Transmission Control Protocol (TCP).

In another embodiment, the K8S-based service deployment method further includes:
 acquiring a scaling rule corresponding to the first target pod; and
 storing the scaling rule so as to scale the first target pod according to an operating load of a system and the scaling rule.

In another embodiment, after the step of acquiring the preset ConfigMap corresponding to the first target pod, the method further includes:
 in response to the proxy receiving data to be transmitted, processing the data to be transmitted through the service to obtain processed data to be transmitted; and
 sending the processed data to be transmitted to a second target pod through the proxy, wherein the second target pod is determined according to the routing information in the preset ConfigMap.

In another embodiment, before the step of sending the processed data to be transmitted to the second target pod through the proxy, the method further includes:
 establishing a communication connection between the proxy in the first target pod and a proxy in the second target pod based on a HyperText Transfer Protocol (HTTP).

In another embodiment, before the step of sending the processed data to be transmitted to the second target pod through the proxy, the method further includes:
 determining a current node where the first target pod is located in the routing information in the preset ConfigMap according to a name of the proxy in the first target pod; and
 determining the second target pod according to the routing information and the current node where the first target pod is located.

In another embodiment, the step of determining the second target pod according to the routing information and the current node where the first target pod is located includes:
 in response to the current node where the first target pod is located being a last node in the routing information, determining a first node in the routing information as the second target pod.

In a second aspect, the present application discloses a K8S-based service deployment apparatus, including:
 a first data acquisition module, configured to acquire service data, the service data including data corresponding to one service;
 a first deployment module, configured to deploy the service on a first target pod according to the service data;
 a second deployment module, configured to deploy a proxy corresponding to the service on the first target pod on the basis of a sidecar manner, so as to use the proxy as a network proxy of the service; and
 a second data acquisition module, configured to acquire a preset ConfigMap corresponding to the first target pod, whereby the proxy performs communication between different pods according to the preset ConfigMap, the preset ConfigMap including routing information.

In a third aspect, the present application discloses an electronic device, including:

a memory and a processor.

The memory is configured to store a computer program.

The processor is configured to execute the computer program to implement the K8S-based service deployment method as disclosed above.

In a fourth aspect, the present application discloses a computer-readable storage medium, configured to store a computer program that is executed by a processor to implement the K8S-based service deployment method as disclosed above.

It can be seen that, in the present application, service data is acquired first, the service data including data corresponding to one service; then, the service is deployed on a first target pod according to the service data; a proxy corresponding to the service is deployed on the first target pod based on a sidecar manner, so as to use the proxy as a network proxy of the service; and a preset ConfigMap corresponding to the first target pod is acquired, whereby the proxy performs communication between different pods according to the preset ConfigMap, wherein the preset ConfigMap includes routing information. Thus it can be seen that, in the present application, after data corresponding to one service is acquired, the service is deployed on a pod according to the received service data. As such, only one service is deployed on one pod, and a separate service does not need to be deployed to string together each independent service on one pod, thus reducing the workload in a service deployment process. The pod may be scaled only according to a load of the service on the pod, thus improving resource utilization. In addition, a plug-in may be added to the service by means of a proxy, recompilation of the entire pod is not required after the plug-in is added, and the proxy may perform communication between different pods according to routing information in a preset ConfigMap, thus making it more convenient to implement communication between the pods.

BRIEF DESCRIPTION OF THE DRAWINGS

In order to describe the technical solutions in embodiments of the present application or the prior art more clearly, the drawings required to be used in descriptions about the embodiments or the prior art will be introduced briefly below. Apparently, the drawings in the description below are only the embodiments of the present application. Those ordinarily skilled in the art may further obtain other drawings according to the provided drawings without creative work.

DETAILED DESCRIPTION

The technical solutions in embodiments of the present application will be described clearly and completely below in combination with the drawings in the embodiments of the present application. Clearly, the described embodiments are not all but only part of embodiments of the present application. All other embodiments obtained by those ordinarily skilled in the art based on the embodiments in the present application without creative work shall fall within the scope of protection of the present application.

Figure 1:
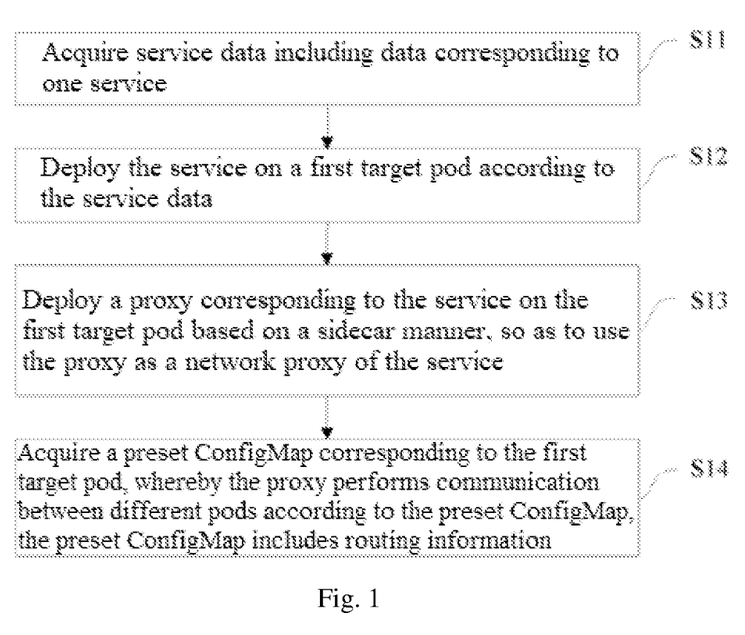
FIG. 1 is a flowchart of a K8S-based service deployment method according to the present application.

Referring to FIG. 1, an embodiment of the present application discloses a K8S-based service deployment method, including the following steps.

In step S11, service data is acquired, wherein the service data includes data corresponding to one service.

In a certain implementation process, service data is required to be acquired, wherein the service data includes data corresponding to one service, so as to deploy the corresponding service on a first pod according to the service data.

In step S12, the service is deployed on a first target pod according to the service data.

Correspondingly, after the service data is acquired, the service may be deployed on a first target pod according to the service data. The first target pod may be a pod selected by a user.

In step S13, a proxy corresponding to the service is deployed on the first target pod based on a sidecar manner, so as to use the proxy as a network proxy of the service.

After the service is deployed on the first target pod, a proxy corresponding to the service is further required to be deployed on the first target pod, so as to use the proxy as a network proxy of the service. the proxy corresponding to the service may be deployed on the first target pod based on a sidecar manner. Sidecar is a deployment form in K8S. In the sidecar manner, a plug-in may be automatically added to a certain type of service, so as to realize a certain function. The proxy deployed in the sidecar manner is transparent to the user, namely proxy transparency is implemented. Proxy transparency refers to that a proxy component is transparent to the user. When the proxy is deployed in the sidecar manner, a plug-in may be automatically added to the service of the user, so the user does not need to configure a content about the proxy, and the proxy is transparent to the user.

In step S14, a preset ConfigMap corresponding to the first target pod is acquired, whereby the proxy performs communication between different pods according to the preset ConfigMap, wherein the preset ConfigMap includes routing information.

After the proxy is deployed on the first target pod, a preset ConfigMap corresponding to the first target pod is further required to be acquired, whereby the proxy performs communication between different pods according to the preset ConfigMap, wherein the preset ConfigMap includes routing information. As such, communication between different pods may be implemented by use of the proxy.

It can be seen that, in the present application, service data is acquired first, the service data including data corresponding to one service; then, the service is deployed on a first target pod according to the service data; a proxy corresponding to the service is deployed on the first target pod based on a sidecar manner, so as to use the proxy as a network proxy of the service; and a preset ConfigMap corresponding to the first target pod is acquired, whereby the proxy performs communication between different pods according to the preset ConfigMap, wherein the preset ConfigMap includes routing information. Thus it can be seen that, in the present application, after data corresponding to one service is acquired, the service is deployed on a pod according to the received service data. As such, only one service is deployed on one pod, and a separate service does not need to be deployed to string together each independent service on one pod, thus reducing the workload in a service deployment process. The pod may be scaled only according to a load of the service on the pod, thus improving resource utilization. In addition, a plug-in may be added to the service by means of a proxy, recompilation of the entire pod is not required after the plug-in is added, and the proxy may perform communication between different pods according to routing information in a preset ConfigMap, thus making it more convenient to implement communication between the pods.

Figure 2:
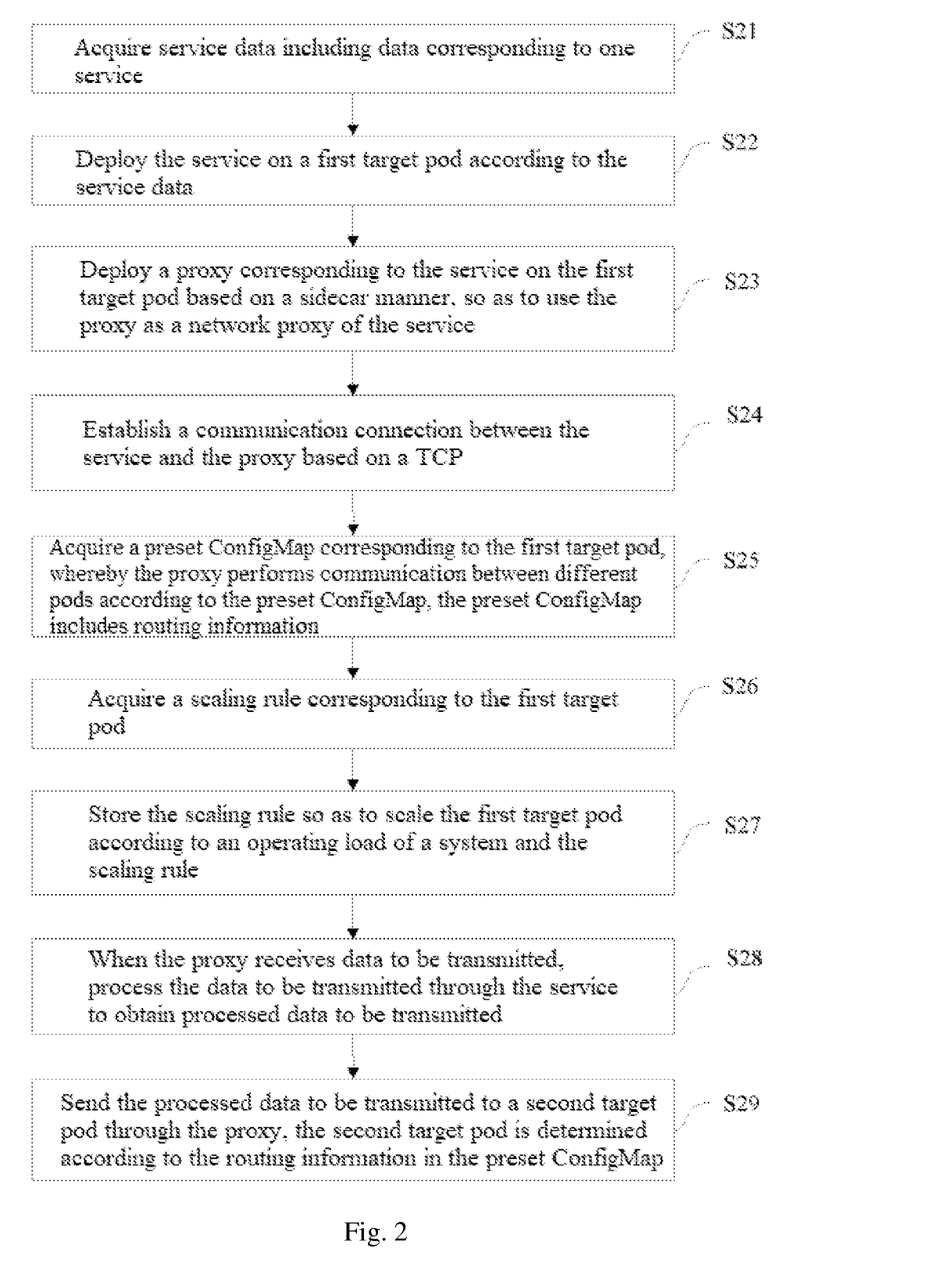
FIG. 2 is a flowchart of a K8S-based service deployment method according to the present application.

Referring to FIG. 2, an embodiment of the present application discloses a K8S-based service deployment method, including the following steps.

In step S21, service data is acquired, wherein the service data includes data corresponding to one service.

In step S22, the service is deployed on a first target pod according to the service data.

In step S23, a proxy corresponding to the service is deployed on the first target pod based on a sidecar manner, so as to use the proxy as a network proxy of the service.

In step S24, a communication connection is established between the service and the proxy based on a TCP.

Figure 3:
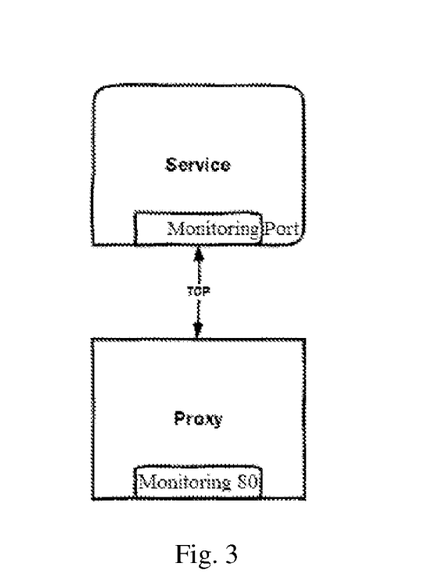
FIG. 3 is a schematic diagram of communication between a proxy and a service according to the present application.

After the proxy is deployed on the first target pod, a communication connection is further required to be established between the service and the proxy based on a TCP. An external port of a proxy container defaults to 80, and TCP communication is established with a port of the service to transmit a request and a response. Referring to FIG. 3, a schematic diagram of a communication principle between a proxy and a service is shown. An external port of the proxy defaults to 80, and TCP communication is established with a port of the service to transmit a request and a response.

In step S25, a preset ConfigMap corresponding to the first target pod is acquired, whereby the proxy performs communication between different pods according to the preset ConfigMap, wherein the preset ConfigMap includes routing information.

Figure 4:
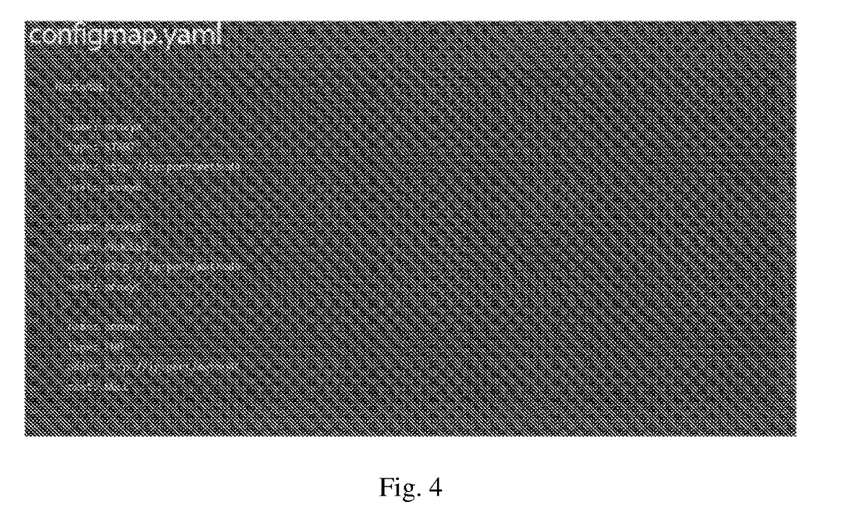
FIG. 4 is a schematic diagram of a preset ConfigMap according to the present application.

It can be understood that, after the communication connection is established between the service and the proxy, a preset ConfigMap corresponding to the first target pod is further required to be acquired, whereby the proxy performs communication between different pods according to the preset ConfigMap, wherein the preset ConfigMap includes routing information. Referring to FIG. 4, information that the preset ConfigMap includes is shown. The preset ConfigMap includes routing information, i.e., RouteMap in the figure. The routing information includes a name and a type of each node. The type of each node includes start, process, and end. The routing information further includes an address of each node and a next node of current node. For example, the routing information in FIG. 4 includes three nodes, where a name of the first node is proxy A, a type of this node is START, an address is http://ip:port/methodA, and a next node is proxy B; a name of the second node is proxy B, a type of this node is PROCESS, an address is http://ip:port/methodB, and a next node is proxy C; and a name of the third node is proxy C, a type of this node is END, an address is http://ip:port/methodC, and a next node is null.

In step S26, a scaling rule corresponding to the first target pod is acquired.

In actual applications, a scaling rule of the first target pod is further required to be set so as to scale the first target pod according to the scaling rule to control the number of duplicates of the first target pod.

In step S27, the scaling rule is stored so as to scale the first target pod according to an operating load of a system and the scaling rule.

After the scaling rule is acquired, the scaling rule may be stored so as to scale the first target pod according to an operating load of a system and the scaling rule. That is, after the scaling rule is stored, the number of duplicates of the first target pod may be controlled according to a load condition of the system where the first target pod is located and the scaling rule. For example, the number of duplicates of the first target pod may be increased according to the scaling rule when the load of the system is relatively low, and the number of duplicates of the first target pod may be reduced according to the scaling rule when the load of the system is relatively high.

Figure 5:
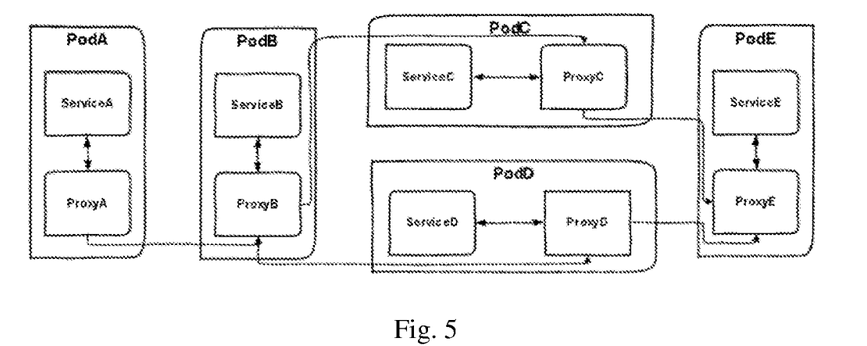
FIG. 5 is a schematic diagram of deploying a pod according to the present application.

Referring to FIG. 5, a schematic diagram of deploying a pod is shown. Services and proxies corresponding to the services may be deployed on multiple pods according to an actual application scenario. For example, service A and proxy A corresponding to service A are deployed on pod A, service B and proxy B corresponding to service B are deployed on pod B, service C and proxy C corresponding to service C are deployed on pod C, service D and proxy D corresponding to service D are deployed on pod D, and service E and proxy E corresponding to service E are deployed on pod E. Proxy A may communicate with proxy B, proxy B may communicate with proxy C and proxy D, and both proxy C and proxy D may communicate with proxy E.

Figure 6:
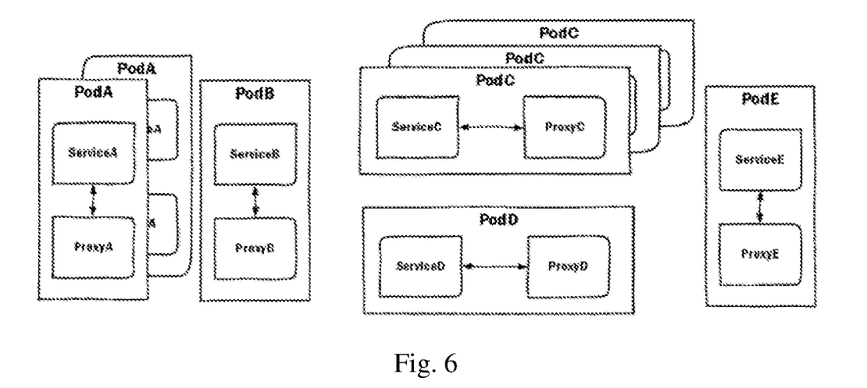
FIG. 6 is a schematic diagram of scaling a pod according to the present application.

Referring to FIG. 6, a schematic diagram of scaling a pod is shown. The number of duplicates of each pod is controlled according to the load of the system and scaling of each pod. The number of duplicates of each pod may be different. For example, the number of duplicates of pod A is controlled to 1 according to the load of the system and a scaling rule of pod A, the number of duplicates of pod B is controlled to 0 according to the load of the system and a scaling rule of pod B, the number of duplicates of pod C is controlled to 2 according to the load of the system and a scaling rule of pod C, the number of duplicates of pod D is controlled to 0 according to the load of the system and a scaling rule of pod D, and the number of duplicates of pod E is controlled to 0 according to the load of the system and a scaling rule of pod E.

In step S28, when the proxy receives data to be transmitted, the data to be transmitted is processed through the service to obtain processed data to be transmitted.

After the pod is deployed, when the proxy in the first target pod receives data to be transmitted, the data to be transmitted is processed through the service to obtain processed data to be transmitted. When the proxy in the first target pod receives the data to be transmitted, the data to be transmitted is sent to the service in the first target pod, and the service in the first target pod processes the data to be transmitted to obtain the processed data to be transmitted.

In step S29, the processed data to be transmitted is sent to a second target pod through the proxy, wherein the second target pod is determined according to the routing information in the preset ConfigMap.

After the processed data to be transmitted is obtained, the processed data to be transmitted may be sent to a second target pod through the proxy, wherein the second target pod is determined according to the routing information in the preset ConfigMap.

Before the step that the processed data to be transmitted is sent to a second target pod through the proxy, the method further includes that: a current node where the first target pod is located in the routing information in the preset ConfigMap is determined according to a name of the proxy in the first target pod; and the second target pod is determined according to the routing information and the current node where the first target pod is located. After the second target pod is determined, address information of the second target pod may be determined from the routing information, and then the processed data to be transmitted may be sent to the second target pod.

The process of determining the second target pod according to the routing information and the current node where the first target pod is located includes: if the current node where the first target pod is located is a last node in the routing information, determining a first node in the routing information as the second target pod. That is, when the proxy receiving the data to be transmitted is a last proxy in the routing information, the proxy may send the received processed data to be transmitted to a first proxy in the routing information such that the first proxy returns a final result to an invoker.

Figure 7:
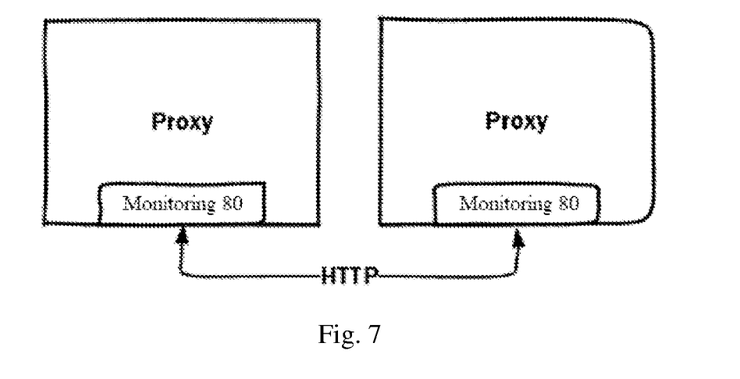
FIG. 7 is a schematic diagram of communication between different proxies according to the present application.

In an implementation process, before the step that the processed data to be transmitted is sent to a second target pod through the proxy, the method further includes that: a communication connection is established between the proxy in the first target pod and a proxy in the second target pod based on a HTTP. Referring to FIG. 7, a schematic diagram of communication between different proxies is shown. Different proxies expose port 80 to the outside, and HTTP communication is established between 80 ports of a current proxy and another proxy to transmit a request and a response.

Figure 8:
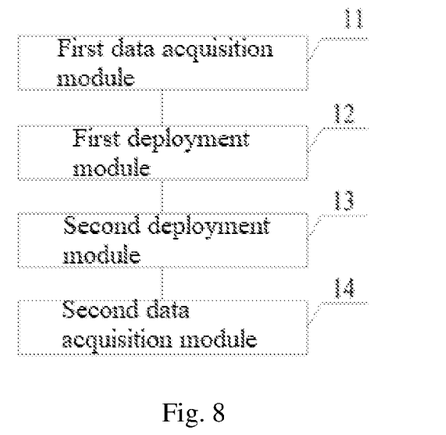
FIG. 8 is a schematic structural diagram of a K8S-based service deployment apparatus according to the present application.

Referring to FIG. 8, an embodiment of the present application discloses a K8S-based service deployment apparatus, including:
  a first data acquisition module 11, configured to acquire service data including data corresponding to one service;
  a first deployment module 12, configured to deploy the service on a first target pod according to the service data;
  a second deployment module 13, configured to deploy a proxy corresponding to the service on the first target pod based on a sidecar manner, so as to use the proxy as a network proxy of the service; and
  a second data acquisition module 14, configured to acquire a preset ConfigMap corresponding to the first target pod, whereby the proxy performs communication between different pods according to the preset ConfigMap, the preset ConfigMap including routing information.

It can be seen that, in the present application, service data is acquired first, the service data including data corresponding to one service; then, the service is deployed on a first target pod according to the service data; a proxy corresponding to the service is deployed on the first target pod based on a sidecar manner, so as to use the proxy as a network proxy of the service; and a preset ConfigMap corresponding to the first target pod is acquired, whereby the proxy performs communication between different pods according to the preset ConfigMap, wherein the preset ConfigMap includes routing information. Thus it can be seen that, in the present application, after data corresponding to one service is acquired, the service is deployed on a pod according to the received service data. As such, only one service is deployed on one pod, and a separate service does not need to be deployed to string together each independent service on one pod, thus reducing the workload in a service deployment process. The pod may be scaled only according to a load of the service on the pod, thus improving resource utilization. In addition, a plug-in may be added to the service by means of a proxy, recompilation of the entire pod is not required after the plug-in is added, and the proxy may perform communication between different pods according to routing information in a preset ConfigMap, thus making it more convenient to implement communication between the pods.

Further, the K8S-based service deployment apparatus further includes:
  a first communication establishment module, configured to establish a communication connection between the service and the proxy based on a TCP.

Further, the K8S-based service deployment apparatus further includes:
  a third data acquisition module, configured to acquire a scaling rule corresponding to the first target pod; and
  a data storage module, configured to store the scaling rule so as to scale the first target pod according to an operating load of a system and the scaling rule.

The service in the first target pod is configured to, when the proxy receives data to be transmitted, process the data to be transmitted to obtain processed data to be transmitted.

Correspondingly, the proxy in the first target pod is configured to send the processed data to be transmitted to a second target pod through the proxy, wherein the second target pod is determined according to the routing information in the preset ConfigMap.

Further, the K8S-based service deployment apparatus further includes:
  a second communication establishment module, configured to establish a communication connection between the proxy in the first target pod and a proxy in the second target pod based on an HTTP.

Further, the K8S-based service deployment apparatus further includes:
  a first node determining module, configured to determine a current node where the first target pod is located in the routing information in the preset ConfigMap according to a name of the proxy in the first target pod; and
  a second node determining module, configured to determine the second target pod according to the routing information and the current node where the first target pod is located.

The second node determining module is configured to:
  if the current node where the first target pod is located is a last node in the routing information, determine a first node in the routing information as the second target pod.

Figure 9:
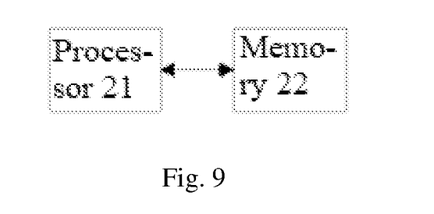
FIG. 9 is a structural diagram of an electronic device according to the present application.

Further, referring to FIG. 9, an embodiment of the present application also discloses an electronic device, including a processor 21 and a memory 22.

The memory 22 is configured to store a computer program. The processor 21 is configured to execute the computer program to implement the K8S-based service deployment method disclosed in the above-mentioned embodiment.

The certain process of the K8S-based service deployment method may refer to the corresponding contents disclosed in the above-mentioned embodiment, and will not be elaborated herein.

Further, an embodiment of the present application also discloses a computer-readable storage medium, configured to store a computer program that is executed by a processor to implement the K8S-based service deployment method disclosed in any one of the above-mentioned embodiments.

The certain process of the K8S-based service deployment method may refer to the corresponding contents disclosed in the above-mentioned embodiment, and will not be elaborated herein.

Each embodiment in the specification is described progressively. Descriptions made in each embodiment focus on differences from the other embodiments, and the same or similar parts in each embodiment refer to the other embodiments. The apparatus disclosed in the embodiments corresponds to the method disclosed in the embodiments, and thus is described relatively briefly, and related parts refer to the descriptions about the method.

The steps of the method or algorithm described in combination with the embodiments disclosed herein may directly be implemented by hardware, a software module executed by the processor, or a combination thereof. The software module may be arranged in a Random Access Memory (RAM), an internal memory, a Read-Only Memory (ROM), an electrically programmable ROM, an electrically erasable programmable ROM, a register, a hard disk, a removable disk, a Compact Disc Read-Only Memory (CD-ROM), or a storage medium in any other form well known in this art.

It is finally to be noted that relational terms herein, such as first and second, are only for distinguishing one entity or operation from another and do not necessarily require or imply the existence of any practical relation or sequence between these entities or operations. Moreover, terms "include" and "contain" or any other variation thereof is intended to cover nonexclusive inclusions, whereby a process, method, object, or device including a series of elements not only includes those elements but also includes other elements that are not clearly listed, or further includes elements intrinsic to the process, the method, the object, or the device. With no more restrictions, an element defined by statement "including a/an . . . " does not exclude the existence of the same other elements in a process, method, object, or device including the element.

The K8S-based service deployment method and apparatus, device, and medium provided in the present application are introduced above in detail. The principle and implementation modes of the present application are described herein with certain examples. The above descriptions about the embodiments are only for helping in understanding the method of the present application and the core concept thereof. In addition, those ordinarily skilled in the art may make variations to the certain implementation modes and the scope of application according to the concept of the present application. In summary, the contents of the specification should not be understood as limitations on the present application.

What is claimed is:

1. A Kubernetes (K8S)-based service deployment method, comprising:
acquiring service data comprising data corresponding to a service;
deploying the service on a first target pod according to the service data;
deploying a proxy corresponding to the service on the first target pod based on a sidecar manner, so as to use the proxy as a network proxy of the service; and
acquiring a preset ConfigMap corresponding to the first target pod, whereby the proxy performs communication between different pods according to the preset ConfigMap, wherein the preset ConfigMap comprises routing information.

2. The K8S-based service deployment method according to claim 1, wherein after the step of deploying the proxy corresponding to the service on the first target pod based on the sidecar manner, the method further comprises:
establishing a communication connection between the service and the proxy based on a Transmission Control Protocol (TCP).

3. The K8S-based service deployment method according to claim 1, further comprising:
acquiring a scaling rule corresponding to the first target pod; and
storing the scaling rule so as to scale the first target pod according to an operating load of a system and the scaling rule.

4. The K8S-based service deployment method according to claim 1, wherein after the step of acquiring the preset ConfigMap corresponding to the first target pod, the method further comprises:
in response to the proxy receiving data to be transmitted, processing the data to be transmitted through the service to obtain processed data to be transmitted; and
sending the processed data to be transmitted to a second target pod through the proxy, wherein the second target pod is determined according to the routing information in the preset ConfigMap.

5. The K8S-based service deployment method according to claim 4, wherein before the step of sending the processed data to be transmitted to the second target pod through the proxy, the method further comprises:
establishing a communication connection between the proxy in the first target pod and a proxy in the second target pod based on a HyperText Transfer Protocol (HTTP).

6. The K8S-based service deployment method according to claim 4, wherein before the step of sending the processed data to be transmitted to the second target pod through the proxy, the method further comprises:
determining a current node where the first target pod is located in the routing information in the preset ConfigMap according to a name of the proxy in the first target pod; and
determining the second target pod according to the routing information and the current node where the first target pod is located.

7. The K8S-based service deployment method according to claim 6, wherein the step of determining the second target pod according to the routing information and the current node where the first target pod is located comprises:
in response to the current node where the first target pod is located being a last node in the routing information, determining a first node in the routing information as the second target pod.

8. An electronic device, comprising:
a memory and a processor,
wherein the memory is configured to store a computer program; and
the processor is configured to execute the computer program to:
acquire service data comprising data corresponding to a service;
deploy the service on a first target pod according to the service data;

deploy a proxy corresponding to the service on the first target pod based on a sidecar manner, so as to use the proxy as a network proxy of the service; and acquire a preset ConfigMap corresponding to the first target pod, whereby the proxy performs communication between different pods according to the preset ConfigMap, wherein the preset ConfigMap comprises routing information.

9. The electronic device according to claim 8, wherein the processor, upon execution of the computer program, is further configured to:

establish a communication connection between the service and the proxy based on a Transmission Control Protocol (TCP).

10. The electronic device according to claim 8, wherein the processor, upon execution of the computer program, is further configured to:

acquire a scaling rule corresponding to the first target pod; and store the scaling rule so as to scale the first target pod according to an operating load of a system and the scaling rule.

11. The electronic device according to claim 8, wherein the processor, upon execution of the computer program, is further configured to:

in response to the proxy receiving data to be transmitted, process the data to be transmitted through the service to obtain processed data to be transmitted; and send the processed data to be transmitted to a second target pod through the proxy, wherein the second target pod is determined according to the routing information in the preset ConfigMap.

12. The electronic device according to claim 11, wherein the processor, upon execution of the computer program, is further configured to:

establish a communication connection between the proxy in the first target pod and a proxy in the second target pod based on a HyperText Transfer Protocol (HTTP).

13. The electronic device according to claim 11, wherein the processor, upon execution of the computer program, is further configured to:

determine a current node where the first target pod is located in the routing information in the preset ConfigMap according to a name of the proxy in the first target pod; and determine the second target pod according to the routing information and the current node where the first target pod is located.

14. The electronic device according to claim 13, wherein the processor, upon execution of the computer program, is further configured to:

in response to the current node where the first target pod is located being a last node in the routing information, determine a first node in the routing information as the second target pod.

15. A non-transitory computer-readable storage medium, configured to store a computer program that is executable by a processor to:

acquire service data comprising data corresponding to a service;

deploy the service on a first target pod according to the service data;

deploy a proxy corresponding to the service on the first target pod based on a sidecar manner, so as to use the proxy as a network proxy of the service; and acquire a preset ConfigMap corresponding to the first target pod, whereby the proxy performs communication between different pods according to the preset ConfigMap, wherein the preset ConfigMap comprises routing information.

16. The non-transitory computer-readable storage medium according to claim 15, wherein the computer program, upon execution by the processor, is further configured to cause the processor to:

establish a communication connection between the service and the proxy based on a Transmission Control Protocol (TCP).

17. The non-transitory computer-readable storage medium according to claim 15, wherein the computer program, upon execution by the processor, is further configured to cause the processor to:

acquire a scaling rule corresponding to the first target pod; and store the scaling rule so as to scale the first target pod according to an operating load of a system and the scaling rule.

18. The non-transitory computer-readable storage medium according to claim 15, wherein the computer program, upon execution by the processor, is further configured to cause the processor to:

in response to the proxy receiving data to be transmitted, process the data to be transmitted through the service to obtain processed data to be transmitted; and send the processed data to be transmitted to a second target pod through the proxy, wherein the second target pod is determined according to the routing information in the preset ConfigMap.

19. The non-transitory computer-readable storage medium according to claim 18, wherein the computer program, upon execution by the processor, is further configured to cause the processor to:

establish a communication connection between the proxy in the first target pod and a proxy in the second target pod based on a HyperText Transfer Protocol (HTTP).

20. The non-transitory computer-readable storage medium according to claim 18, wherein the computer program, upon execution by the processor, is further configured to cause the processor to:

determine a current node where the first target pod is located in the routing information in the preset ConfigMap according to a name of the proxy in the first target pod; and determine the second target pod according to the routing information and the current node where the first target pod is located.

* * * * *